US012649584B1

(12) United States Patent
   Clark et al.

(10) Patent No.: US 12,649,584 B1
(45) Date of Patent: Jun. 9, 2026

(54) COOLING SYSTEM FOR AIRCRAFT POWERPLANT ELECTRONICS

(71) Applicant: RTX Corporation, Farmington, CT (US)

(72) Inventors: Thomas E. Clark, Wells, ME (US); Murat Yazici, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/070,791

(22) Filed: Mar. 5, 2025

(51) Int. Cl.
   B64D 33/10 (2006.01)
   B64D 27/33 (2024.01)

(52) U.S. Cl.
   CPC ............. B64D 33/10 (2013.01); B64D 27/33 (2024.01)

(58) Field of Classification Search
   CPC ................................ B64D 33/10; B64D 27/33
   See application file for complete search history.

(56) References Cited

U.S. PATENT DOCUMENTS

| | | | | |
|---|---|---|---|---|
| 5,123,242 A | * | 6/1992 | Miller | F28F 27/02 |
| | | | | 60/39.83 |
| 8,300,412 B2 | * | 10/2012 | Pal | H05K 7/20409 |
| | | | | 361/689 |
| 10,677,166 B2 | * | 6/2020 | Pesyna | F02K 3/06 |
| 11,791,691 B2 | * | 10/2023 | Seki | H02K 9/02 |
| | | | | 290/52 |
| 11,808,210 B2 | * | 11/2023 | Suciu | F02C 7/185 |
| 12,004,334 B2 | * | 6/2024 | Pal | F01D 25/12 |
| 2008/0230651 A1 | * | 9/2008 | Porte | F02C 7/14 |
| | | | | 60/785 |
| 2019/0145316 A1 | * | 5/2019 | Schwarz | F02K 3/04 |
| | | | | 60/728 |
| 2023/0041836 A1 | | 2/2023 | Pal | |
| 2025/0250940 A1 | * | 8/2025 | Clark | F02K 3/06 |

FOREIGN PATENT DOCUMENTS

| | | |
|---|---|---|
| FR | 2995497 B1 | 6/2016 |
| WO | 2024023316 A1 | 2/2024 |

* cited by examiner

*Primary Examiner* — Jesse S Bogue
(74) *Attorney, Agent, or Firm* — Getz Balich LLC

(57) ABSTRACT

An assembly is provided for an aircraft powerplant. This assembly includes a vane structure, a first electric device and a cooling system. The first electric device is disposed within the vane structure. The first electric device includes a first device housing and first electrical circuitry. The first electrical circuitry is housed within an interior of the first device housing. The cooling system is configured to cool the first electrical circuitry. The cooling system includes a first heat exchanger and an air circuit. The first heat exchanger is disposed within the vane structure and thermally coupled to the first electric device. The air circuit extends within the vane structure from an airflow inlet into the air circuit, through the first heat exchanger, to an airflow outlet from the air circuit. The airflow inlet fluidly couples the air circuit to a volume external to the vane structure.

20 Claims, 6 Drawing Sheets

COOLING SYSTEM FOR AIRCRAFT POWERPLANT ELECTRONICS

BACKGROUND OF THE DISCLOSURE

1. Technical Field

This disclosure relates generally to an aircraft and, more particularly, to a cooling system for a powerplant of the aircraft.

2. Background Information

An aircraft powerplant includes various components which utilize cooling during aircraft powerplant operation. Various cooling systems and methods are known in the art. While these known cooling systems and methods have various benefits, there is still room in the art for improvement.

SUMMARY OF THE DISCLOSURE

According to an aspect of the present disclosure, an assembly is provided for an aircraft powerplant. This assembly includes a vane structure, a first electric device and a cooling system. The first electric device is disposed within the vane structure. The first electric device includes a first device housing and first electrical circuitry. The first electrical circuitry is housed within an interior of the first device housing. The cooling system is configured to cool the first electrical circuitry. The cooling system includes a first heat exchanger and an air circuit. The first heat exchanger is disposed within the vane structure and thermally coupled to the first electric device. The air circuit extends within the vane structure from an airflow inlet into the air circuit, through the first heat exchanger, to an airflow outlet from the air circuit. The airflow inlet fluidly couples the air circuit to a volume external to the vane structure.

According to another aspect of the present disclosure, another assembly is provided for an aircraft powerplant. This assembly includes a first electric device, a second electric device and a cooling system. The first electric device includes a first device housing and first electrical circuitry. The first electrical circuitry is housed within an interior of the first device housing. The second electric device includes a second device housing and second electrical circuitry. The second electrical circuitry is housed within an interior of the second device housing. The cooling system is configured to cool the first electrical circuitry and the second electrical circuitry. The cooling system includes a first heat exchanger disposed laterally between and thermally coupled to the first electric device and the second electric device.

According to still another aspect of the present disclosure, another assembly is provided for an aircraft powerplant. This assembly includes a first electric device and a cooling system. The first electric device includes a first device housing and first electrical circuitry. The first electrical circuitry is housed within an interior of the first device housing. The cooling system is configured to cool the first electrical circuitry. The cooling system includes a first heat exchanger, an air circuit and a closed loop fluid circuit. The first heat exchanger is configured to transfer heat energy between air flowing in the air circuit and a working fluid flowing in the closed loop fluid circuit. The first electric device is mounted to a side of the first heat exchanger. The air circuit extends through the first heat exchanger. The closed loop fluid circuit extends through the first heat exchanger and the first electric device. The closed loop fluid circuit is thermally coupled to the first electrical circuitry. The closed loop fluid circuit includes a pump configured to circulate the working fluid.

The cooling system may also include an air circuit extending through the first heat exchanger.

The cooling system may also include a closed loop fluid circuit extending in parallel through the first electric device and the second electric device, and through the first heat exchanger.

The assembly may also include a turbine engine, a first electric machine, a second electric machine, a first controller and a second controller. The first electric machine may be operatively coupled to the turbine engine. The second electric machine may be operatively coupled to the turbine engine. The first controller may be electrically coupled to the first electric machine. The first controller may be configured as or otherwise include the first electric device. The second controller may be electrically coupled to the second electric machine. The second controller may be configured as or otherwise include the second electric device.

The first electric device may be next to the first heat exchanger.

The first electric device may be mounted to the first heat exchanger.

The first electrical circuitry may be thermally coupled to the first heat exchanger by conduction through at least a sidewall of the first electric device between the first electrical circuitry and the first heat exchanger.

The cooling system may also include a fluid circuit thermally coupling the first heat exchanger to the first electric device. The fluid circuit may extend through the first heat exchanger.

The fluid circuit may extend through the first electric device.

The fluid circuit may include a second heat exchanger thermally coupled to the first electrical circuitry. The fluid circuit may extend through the second heat exchanger.

The second heat exchanger may be at least partially disposed within the interior of the first device housing.

The assembly may also include a second electric device disposed within the vane structure. The second electric device may include a second device housing and second electrical circuitry. The second electrical circuitry may be housed within an interior of the second device housing. The cooling system may be configured to cool the second electrical circuitry. The fluid circuit may thermally couple the first heat exchanger to the second electric device.

The fluid circuit may extend in parallel through the first electric device and the second electric device.

The fluid circuit may be a closed loop fluid circuit. The fluid circuit may include a circuit path, a pump and a reservoir fluidly coupled inline along the circuit path with the first heat exchanger.

The air circuit may include a flow regulator configured to regulate a flow of air directed from the airflow inlet to the first heat exchanger.

The assembly may also include a second electric device disposed within the vane structure. The second electric device may include a second device housing and second electrical circuitry. The second electrical circuitry may be housed within an interior of the second device housing. The cooling system may be configured to cool the second electrical circuitry. The first heat exchanger may be thermally coupled to the second electric device within the vane structure.

The first heat exchanger may be disposed between the first electric device and the second electric device.

The vane structure may be configured as a bifurcation structure.

The assembly may also include a compressor section, a combustor section, a turbine section and a flowpath. The flowpath may bypass the compressor section, the combustor section and/or the turbine section. The flowpath may include the volume external to the vane structure.

The volume external to the vane structure may be an environment external to the aircraft powerplant.

The assembly may also include a first electric machine and a first controller. The first electric machine may be configurable as a first electric motor and/or a first electric generator. The first controller may be configured to control operation of the first electric machine. The first controller may be configured as or otherwise include the first electric device.

The assembly may also include a rotating structure operatively coupled to the first electric machine. The rotating structure may include a bladed rotor.

The assembly may also include a turbine engine. The first electric machine may be operatively coupled to the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
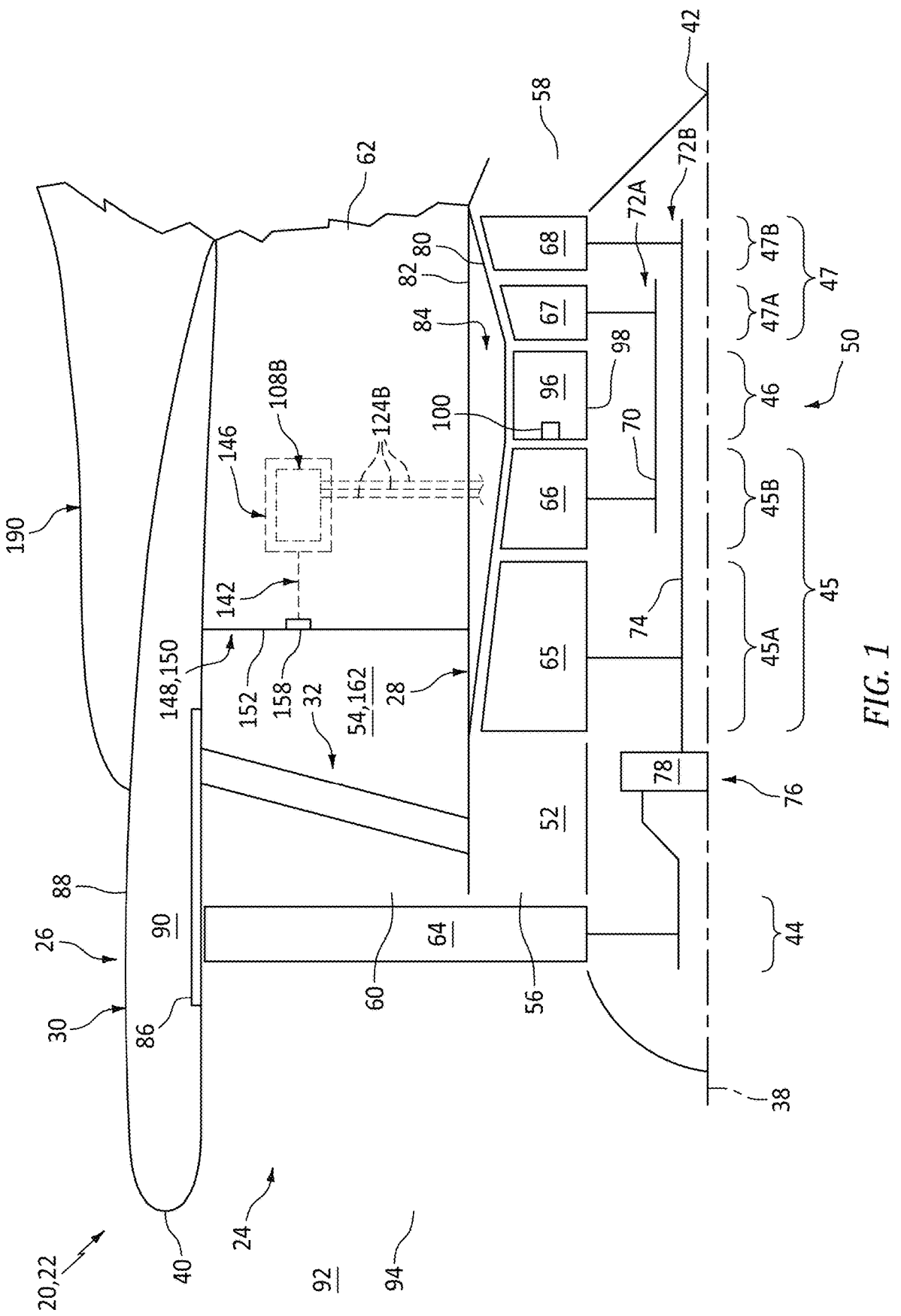
FIG. 1 is a partial schematic illustration of an aircraft propulsion system with a ducted propulsor rotor.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 also includes an electric machine system 34 (see FIG. 2) and a cooling system 36 (see FIG. 3). The aircraft propulsion system 22 extends axially along an axis 38 between an axial upstream, forward end 40 of the aircraft propulsion system 22 and an axial downstream, aft end 42 of the aircraft propulsion system 22. Briefly, the propulsion system axis 38 may be a centerline axis of the aircraft propulsion system 22, the turbine engine 24 and/or one or more of its members. The propulsion system axis 38 may also or alternatively be a rotational axis for one or more members of the turbine engine 24.

The aircraft propulsion system 22 and its turbine engine 24 of FIG. 1 include a propulsor section 44 (e.g., a fan section), a compressor section 45, a combustor section 46 and a turbine section 47. The compressor section 45 of FIG. 1 includes a low pressure compressor (LPC) section 45A and a high pressure compressor (HPC) section 45B. The turbine section 47 of FIG. 1 includes a high pressure turbine (HPT) section 47A and a low pressure turbine (LPT) section 47B. At least (or only) the LPC section 45A, the HPC section 45B, the combustor section 46, the HPT section 47A and the LPT section 47B collectively form a core 50 (e.g., a gas generator) of the turbine engine 24. The aircraft propulsion system 22 and its turbine engine 24 of FIG. 1 also include a core flowpath 52 (e.g., an annular core flowpath) and a bypass flowpath 54 (e.g., an annular bypass flowpath). The core flowpath 52 extends sequentially through the LPC section 45A, the HPC section 45B, the combustor section 46, the HPT section 47A and the LPT section 47B from an airflow inlet 56 into the core flowpath 52 to a combustion products exhaust 58 out from the core flowpath 52. The bypass flowpath 54 extends through a bypass duct from an airflow inlet 60 into the bypass flowpath 54 to an airflow exhaust 62 from the bypass flowpath 54, where the bypass duct may be formed by the inner housing structure 28 and the outer housing structure 30. The bypass flowpath 54 and its bypass duct are configured to bypass (e.g., are disposed radially outboard of and extend along) the engine core 50 and the inner housing structure 28.

The propulsor section 44, the LPC section 45A, the HPC section 45B, the combustor section 46, the HPT section 47A and the LPT section 47B may be arranged sequentially along the propulsion system axis 38 within the propulsion system housing 26. The propulsor section 44 includes a bladed propulsor rotor 64; e.g., a fan rotor. The LPC section 45A includes a bladed low pressure compressor (LPC) rotor 65. The HPC section 45B includes a bladed high pressure compressor (HPC) rotor 66. The HPT section 47A includes a bladed high pressure turbine (HPT) rotor 67. The LPT section 47B includes a bladed low pressure turbine (LPT) rotor 68. Each of these engine rotors 64-68 includes a rotor base (e.g., a disk or a hub) and a plurality of rotor blades (e.g., airfoils, vanes, etc.). The rotor blades may be arranged into one or more stages axially along the respective engine rotor 64-68. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 66 is coupled to and rotatable with the HPT rotor 67. The HPC rotor 66 of FIG. 1, for example, is connected to the HPT rotor 67 through a high speed shaft 70. At least (or only) the HPC rotor 66, the HPT rotor 67 and the high speed shaft 70 collectively form a high speed rotating structure 72A; e.g., a high speed spool of the turbine engine 24 and its engine core 50. This high speed rotating structure 72A of FIG. 1 and its members 66, 67 and 70 are rotatable about the propulsion system axis 38. However, it is contemplated the high speed rotating structure 72A may alternatively be rotatable about another axis radially and/or angularly offset from the rotational axis of the propulsor rotor 64 and/or the centerline axis of the turbine engine 24.

The LPC rotor 65 is coupled to and rotatable with the LPT rotor 68. The LPC rotor 65 of FIG. 1, for example, is connected to the LPT rotor 68 through a low speed shaft 74. At least (or only) the LPC rotor 65, the LPT rotor 68 and the low speed shaft 74 collectively form a low speed rotating structure 72B; e.g., a low speed spool of the turbine engine 24 and its engine core 50. This low speed rotating structure 72B of FIG. 1 and its members 65, 68 and 74 are rotatable about the propulsion system axis 38. However, it is contemplated the low speed rotating structure 72B may alternatively be rotatable about another axis radially and/or angularly offset from the rotational axis of the propulsor rotor 64 and/or the centerline axis of the turbine engine 24.

The low speed rotating structure 72B is coupled to the propulsor rotor 64 through a propulsor drivetrain 76. The propulsor drivetrain 76 may be configured as a geared drivetrain, where a geartrain 78 (e.g., a transmission, a speed change device, an epicyclic geartrain, etc.) is disposed between and operatively couples the propulsor rotor 64 to the low speed rotating structure 72B and its LPT rotor 68. With this arrangement, the propulsor rotor 64 may rotate at a different (e.g., slower) rotational speed than the low speed rotating structure 72B and its LPT rotor 68. Here, the propulsor rotor 64 and the low speed rotating structure 72B may rotate in a common (the same) direction about the propulsion system axis 38 or in opposite directions about the propulsion system axis 38 depending, for example, upon the specific configuration of the geartrain 78. Alternatively, the propulsor drivetrain 76 may be configured as a direct-drive drivetrain, where the geartrain 78 is omitted. With such an arrangement, the propulsor rotor 64 rotates at a common (the same) rotational speed as the low speed rotating structure 72B and its LPT rotor 68.

The inner housing structure 28 of FIG. 1 includes an inner case 80 (e.g., a core case) for the turbine engine 24, an inner nacelle structure 82 (sometimes referred to as an inner fixed structure (IFS)) and an internal inner housing compartment 84 (e.g., an engine core compartment). The inner case 80 is disposed radially outboard of, extends axially along and may circumscribe one or more or all of the engine sections 45A-47B and the engine rotors 65-68. The inner case 80 may thereby house and provide a support structure for the respective engine sections 45A-47B and the engine rotors 65-68. The inner nacelle structure 82 is configured to provide an aerodynamic cover over the engine core 50 and its inner case 80. At least (or only) the inner housing structure 28 and its inner nacelle structure 82 may collectively form a radial inner peripheral boundary of the bypass flowpath 54. The inner housing compartment 84 of FIG. 1 is formed by and is disposed radially between the inner case 80 and an inner barrel of the inner nacelle structure 82.

The outer housing structure 30 of FIG. 1 includes an outer case 86 (e.g., a fan case) for the turbine engine 24, an outer nacelle structure 88 and an internal outer housing compartment 90. The outer case 86 is disposed radially outboard of, extends axially along and may circumscribe the propulsor section 44 and its propulsor rotor 64. The outer case 86 may thereby house and may be configured as a containment structure for the propulsor section 44 and its propulsor rotor 64. The outer nacelle structure 88 is configured to provide an aerodynamic cover over the outer case 86. At least (or only) the outer housing structure 30 and its outer nacelle structure 88 may collectively form a radial outer peripheral boundary of the bypass flowpath 54. The outer housing compartment 90 of FIG. 1 is formed by and is disposed radially between the outer case 86 and the outer nacelle structure 88; e.g., outer cowls of the outer nacelle structure 88.

During operation of the aircraft propulsion system 22 of FIG. 1, ambient air from an environment 92 external to the aircraft and its aircraft propulsion system 22 enters the aircraft propulsion system 22 and its turbine engine 24 through an airflow inlet 94. This air is propelled by the rotating propulsor rotor 64 in a downstream, aft direction towards the propulsion system aft end 42.

An outer stream of the air propelled by the rotating propulsor rotor 64 is directed into the bypass flowpath 54 through its bypass inlet 60, which air entering the bypass flowpath 54 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 62 to provide forward thrust. The propulsion of the bypass air may account for a majority of the forward thrust generated by the aircraft propulsion system 22 and its turbine engine 24 of FIG. 1.

An inner stream of the air propelled by the rotating propulsor rotor 64 is directed into the core flowpath 52 through its core inlet 56, which air entering the core flowpath 52 may be referred to as "core air". This core air is compressed by the LPC rotor 65 and the HPC rotor 66 and is directed into a combustion chamber 96 (e.g., annular combustion chamber) of a combustor 98 (e.g., annular combustor) in the combustor section 46. Fuel is injected into the combustion chamber 96 by one or more fuel injectors 100 and mixed with the compressed core air to provide a fuel-air mixture. This fuel-air mixture is ignited and combustion products thereof flow through and sequentially drive rotation of the HPT rotor 67 and the LPT rotor 68. The rotation of the HPT rotor 67 and the LPT rotor 68 respectively drive rotation of the HPC rotor 66 and the LPC rotor 65 and, thus, compression of the air received from the core inlet 56. The rotation of the LPT rotor 68 also drives rotation of the propulsor rotor 64 through the propulsor drivetrain 76.

While the turbine engine 24 in FIG. 1 is shown with a particular two rotating structure arrangement, the present disclosure is not limited thereto. For example, the LPC rotor 65 may be omitted to configure the LPT rotor 68 as a power turbine (PT) rotor for the propulsor rotor 64. In another example, the turbine engine 24 may also include another rotating structure; e.g., an intermediate speed spool for the turbine engine 24 and its engine core 50.

Figure 2:
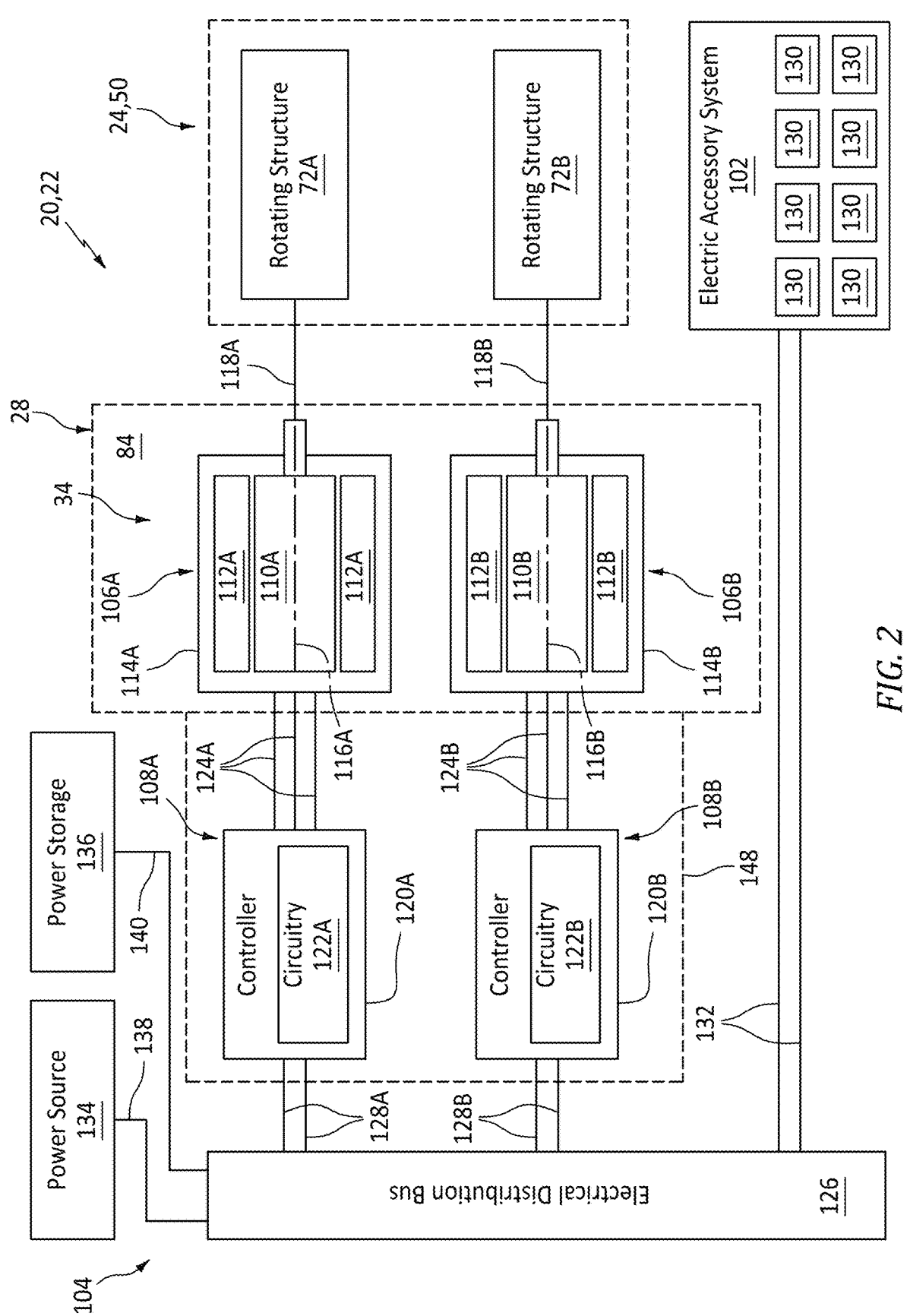
FIG. 2 is a schematic illustration of a portion of the aircraft propulsion system at an electric machine system.

Referring to FIG. 2, the electric machine system 34 is electrically coupled to an optional electric accessory system 102 and an electrical system 104 for the aircraft and its aircraft propulsion system 22. The electric machine system

34 of FIG. 2 includes one or more electric machines 106A and 106B (generally referred to as "106") and one or more electric machine (EM) controllers 108A and 108B (generally referred to as "108"). For ease of description, each electric machine 106 of FIG. 2 is described below as being electrically coupled to, controlled by and/or otherwise associated with a single, dedicated EM controller 108. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with the single electric machine.

Each electric machine 106A, 106B of FIG. 2 includes an electric machine rotor 110A, 110B (generally referred to as "110"), an electric machine stator 112A, 112B (generally referred to as "112") and an electric machine housing 114A, 114B (generally referred to as "114"); e.g., a case. The machine rotor 110A, 110B is rotatable about a rotational axis 116A, 116B (generally referred to as "116") of the respective machine rotor 110A, 110B, which electric machine (EM) axis 116 may also be a centerline axis of the respective electric machine 106. The machine stator 112 of FIG. 2 is radially outboard of and circumscribes the machine rotor 110. With this arrangement, each electric machine 106 is configured as a radial flux electric machine. The electric machines 106 of the present disclosure, however, are not limited to such an exemplary rotor-stator configuration nor to radial flux arrangements. The machine rotor 110, for example, may alternatively be radially outboard of and circumscribe the machine stator 112. In another example, the machine rotor 110 may be axially next to the machine stator 112 configuring the electric machine 106 as an axial flux electric machine. Referring again to FIG. 2, the machine rotor 110 and the machine stator 112 are at least partially or completely housed within an interior of the machine housing 114.

Each electric machine 106A, 106B may be operatively coupled to a respective one of the engine rotating structures 72A, 72B (generally referred to as "72"). Each machine rotor 110A, 110B of FIG. 2, for example, is mechanically coupled to and rotatable with the respective engine rotating structure 72A, 72B through an engine-electric machine drivetrain 118A, 118B (generally referred to as "118"). This engine-electric machine drivetrain 118 may be configured as or otherwise include a shaft, a tower shaft assembly, an accessory gearbox, an angle gearbox, and/or the like. For ease of description, each machine rotor 110 of FIG. 2 is described below as being coupled to and rotatable with a unique one of the engine rotating structures 72 of the turbine engine 24. However, it is contemplated multiple machine rotors may alternatively be coupled to and rotatable with a common engine rotating structure; e.g., 72A or 72B. It is also contemplated a single one of the machine rotors may be coupled to and rotatable with multiple engine rotating structures, directly or through another device such as a differential or a clutch system. In addition, while the electric machines 106 are described above as being coupled to the engine rotating structures 72, it is contemplated the machine rotor 110 of one or more of the electric machines 106 may also or alternatively be operatively coupled to another rotating device through the engine-electric machine drivetrain 118 such as, but not limited to, a pump rotor, an auxiliary compressor rotor, an actuator rotor, or the like.

Each electric machine 106 of FIG. 2 may be configurable as an electric motor and/or an electric generator; e.g., an electric motor-generator. For example, during a respective motor mode of operation, each electric machine 106 may operate as the electric motor to convert electricity received from the aircraft electrical system 104 into mechanical power. The machine stator 112, for example, may generate an electromagnetic field with the machine rotor 110 using a current of electricity received from the aircraft electrical system 104 through the respective EM controller 108. This electromagnetic field may drive rotation of the machine rotor 110. The machine rotor 110, in turn, may provide mechanical power to and drive rotation of the respective engine rotating structure 72 through the respective engine-electric machine drivetrain 118. This mechanical power may be provided to boost power or completely power the rotation of the respective engine rotating structure 72. By contrast, during a respective generator mode of operation, each electric machine 106 may operate as the electric generator to convert mechanical power received from the respective engine rotating structure 72 into electricity. Rotation of the machine rotor 110, for example, may be rotationally driven by rotation of the respective engine rotating structure 72 through the engine-electric machine drivetrain 118. The rotation of the machine rotor 110 may generate an electromagnetic field with the machine stator 112, and the machine stator 112 may convert energy from the electromagnetic field into electricity. The electric machine 106 may then provide a current of electricity to the aircraft electrical system 104 through the respective EM controller 108 for storage and/or further use. The electric machines 106 of the present disclosure, however, are not limited to such exemplary operation. For example, one or more of the electric machines 106 may each alternatively be configured as a dedicated electric generator; e.g., without the electric motor functionality. In another example, one or more of the electric machines 106 may each alternatively be configured as a dedicated electric motor; e.g., without the electric generator functionality.

Each EM controller 108A, 108B includes a controller housing 120A, 120B (generally referred to as "120") and internal controller circuitry 122A, 122B (generally referred to as "122"). The controller housing 120 may be configured as an enclosed case (e.g., a closed or sealed container) for the respective controller circuitry 122. The controller circuitry 122 is disposed within an interior of the respective controller housing 120; e.g., an internal chamber or other volume(s) within and enclosed by the controller housing 120. The controller circuitry 122 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), processing device(s), memory module(s), communication module(s), electrical transformer(s), electrical rectifier(s), and/or the like.

Each EM controller 108A, 108B is electrically coupled to the respective electric machine 106A, 106B through one or more electric cables 124A, 124B (generally referred to as "124"); e.g., high voltage electric cables, power feeder cables, etc. More particularly, the controller circuitry 122 of each EM controller 108 is electrically coupled to the respective electric machine 106 and its machine stator 112 through the respective electric cables 124. Similarly, each EM controller 108A, 108B is electrically coupled to an electrical distribution bus 126 of the aircraft electrical system 104 through one or more electric cables 128A, 128B (generally referred to as "128"); e.g., high voltage electric cables, power feeder cables, etc. More particularly, the controller circuitry 122 of each EM controller 108 is electrically coupled to the aircraft electrical system 104 and its electrical distribution bus 126 through the respective electric cables 128.

Each EM controller 108 and its controller circuitry 122 are configured to control operation of the respective electric machine 106. For example, when operating as the electric motor, each EM controller 108 and its controller circuitry 122 are configured to regulate a flow of electricity from the aircraft electrical system 104 to the respective electric machine 106. This electricity flow regulation may include: (a) turning-on the flow of electricity from the aircraft electrical system 104 to the respective electric machine 106 (e.g., electrically coupling the respective electric machine 106 to the aircraft electrical system 104); (b) turning-off the flow of electricity from the aircraft electrical system 104 to the respective electric machine 106 (e.g., electrically decoupling the respective electric machine 106 from the aircraft electrical system 104); (c) moderating the flow of electricity from the aircraft electrical system 104 to the respective electric machine 106. Here, each EM controller 108 operates as a motor controller. In another example, when operating as the electric generator, each EM controller 108 and its controller circuitry 122 are configured to regulate a flow of electricity from the respective electric machine 106 to the aircraft electrical system 104. This electricity flow regulation may include: (a) turning-on the flow of electricity from the respective electric machine 106 to the aircraft electrical system 104 (e.g., electrically coupling the respective electric machine 106 to the aircraft electrical system 104); (b) turning-off the flow of electricity from the respective electric machine 106 to the aircraft electrical system 104 (e.g., electrically decoupling the respective electric machine 106 from the aircraft electrical system 104); (c) moderating the flow of electricity from the respective electric machine 106 to the aircraft electrical system 104. Here, the EM controller 108 operates as a generator controller.

The electric accessory system 102 includes one or more electric devices 130. The electric devices 130 may include one or more electric actuators, one or more electric pumps, one or more electric valves and/or one or more fluid separator(s) (e.g., de-oiler(s)). The electric actuator(s) may include one or more electric linear actuators and/or one or more electric rotary actuators. The electric pump(s) may include one or more electric liquid pumps and/or one or more electric gas pumps (e.g., electric air compressor(s)). The electric devices 130 of FIG. 2 may be configured as part of one or more sub-systems for the aircraft propulsion system 22 and its turbine engine 24. Examples of these sub-systems include, but are not limited to: a fuel system for delivering the fuel to the fuel injectors 100 (see FIG. 1); a lubrication system for delivering lubricant (e.g., oil) to one or more lubricated components (e.g., bearing(s), gear system(s), seal system(s), etc.) of the aircraft propulsion system 22 and its turbine engine 24; a cooling system for delivering coolant (e.g., liquid coolant, air, etc.) to one or more fluid cooled components of the aircraft propulsion system 22 and its turbine engine 24; and an actuation system for moving one or more adjustable components (e.g., variable guide vanes, a variable area nozzle, etc.) of the aircraft propulsion system 22 and its turbine engine 24. One, some or all of these sub-systems may be discrete (e.g., operationally, mechanically, fluidly, etc. independent) from one another. Alternatively, some of the sub-systems may be integrated to share, for example, a common working fluid such as the lubricant or the fuel. The present disclosure, however, is not limited to the foregoing exemplary electric devices or sub-systems which may include those electric devices.

Each electric device 130 is electrically coupled to the electrical distribution bus 126 of the aircraft electrical system 104 through one or more electric cables 132 (collectively schematically shown in FIG. 2); e.g., high voltage electric cables, low voltage electric cables, power feeder cables, etc. Each electric device 130 may thereby receive a current of electricity from the aircraft electrical system 104 to power operation thereof.

The aircraft electrical system 104 includes the electrical distribution bus 126. This aircraft electrical system 104 may also include a power source 134 and/or a power storage 136. The electrical distribution bus 126 is electrically coupled to each electric machine 106 through the respective EM controller 108. The electrical distribution bus 126 is electrically coupled to each of the electric devices 130. The electrical distribution bus 126 is also electrically coupled to the power source 134 and the power storage 136, respectively schematically shown via lines 138 and 140. With this arrangement, the electrical distribution bus 126 provides an intermediate connection between the various electrical aircraft propulsion system members 106A (via 108A), 106B (via 108B), 130, 134 and/or 136. The power source 134 may be an electric generator powered by the turbine engine 24 or an electric generator powered by another aircraft powerplant; e.g., an engine of a companion aircraft propulsion system, an engine of an auxiliary power unit (APU), a fuel cell system, etc. The power storage 136 is configured to receive electricity from the electrical distribution bus 126 for storage. The power storage 136 is also configured to provide the stored electricity to the electrical distribution bus 126. The power storage 136, for example, may be configured as or otherwise include one or more electricity storage devices; e.g., batteries, super capacitors, etc. With the foregoing aircraft electrical system arrangement, the electrical current provided to one, some or all of the electric devices 130 may be received, through the electrical distribution bus 126, from any one, some or all of the electrical aircraft propulsion system members 106A, 106B, 134 and/or 136. It is also contemplated the electrical current provided to one of the electric machines 106 may be received from another one of the electric machines 106 through the aircraft electrical system 104 and its electrical distribution bus 126.

Figure 3:
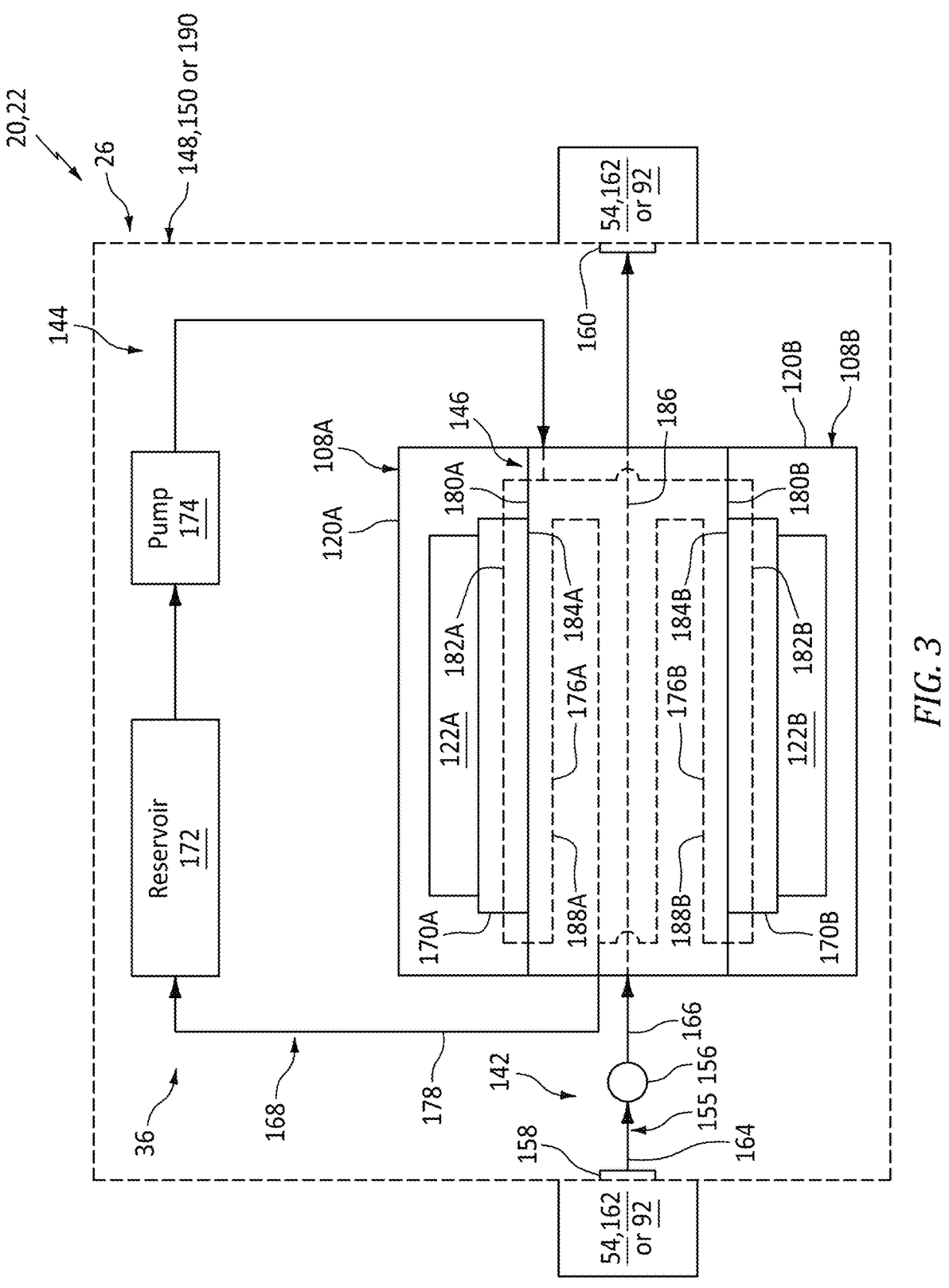
FIG. 3 is a schematic illustration of a portion of the aircraft propulsion system at a cooling system.

Referring to FIG. 3, the cooling system 36 is configured to cool and/or otherwise service one or more electric devices such as the EM controllers 108. The cooling system 36 of FIG. 3, for example, includes one or more cooling circuits such as a cooling system air circuit 142 and a cooling system fluid circuit 144. This cooling system 36 of FIG. 3 also includes a cooling system heat exchanger 146.

Figure 4:
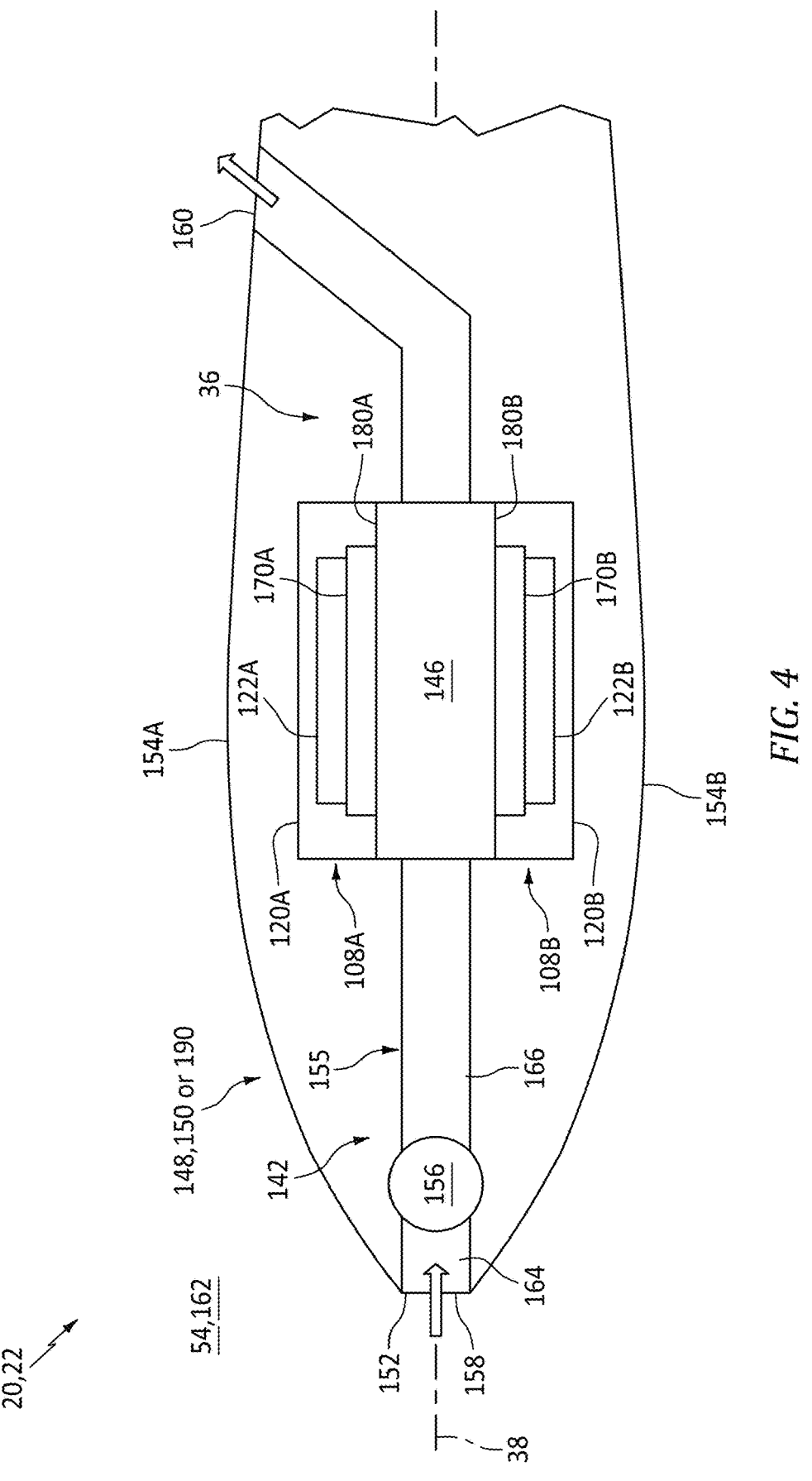
FIG. 4 is a schematic illustration of a portion of the cooling system at a vane structure of the aircraft propulsion system.

The cooling system 36 and its serviced EM controllers 108 may be partially or completely housed within and/or otherwise arranged with a vane structure 148 for the aircraft propulsion system 22. Referring to FIG. 1, the vane structure 148 may be configured as or otherwise include a bifurcation structure 150 of the propulsion system housing 26 disposed in the bypass flowpath 54. This vane structure 148 of FIG. 1 projects axially along the propulsion system axis 38 within a longitudinal section of the bypass flowpath 54 to an upstream leading edge 152 of the vane structure 148. Here, the structure leading edge 152 is axially spaced downstream from the guide vane structure 32. The vane structure 148 of FIG. 1 extends radially across the respective longitudinal section of the bypass flowpath 54 from the inner housing structure 28 to the outer housing structure 30, where the vane structure 148 may also be connected to the inner housing structure 28 and/or the outer housing structure 30. The vane structure 148 of FIG. 1 thereby circumferentially bifurcates the respective longitudinal section of the bypass flowpath 54. Referring to FIG. 4, the vane structure 148 extends laterally (e.g., circumferentially about the propulsion system axis 38, tangentially to a reference circle circumscribing the propulsion system axis 38, etc.) between opposing lateral sides 154A and 154B (generally referred to as "154") of the vane structure 148. Each of these structure sides 154 projects axially to and may meet at the structure leading edge 152.

The cooling system air circuit 142 of FIG. 4 includes an air circuit path 155, the cooling system heat exchanger 146 and a flow regulator 156. This cooling system air circuit 142 is thermally coupled to each EM controller 108 and its electrical circuitry 122 through the cooling system heat exchanger 146 as described below in further detail.

The air circuit path 155 of FIG. 4 extends longitudinally within the vane structure 148 from an airflow inlet 158 into the cooling system air circuit 142 and its air circuit path 155 to an airflow outlet 160 from the cooling system air circuit 142 and its air circuit path 155 in an open loop. More particularly, the air circuit path 155 extends longitudinally from the air circuit inlet 158, sequentially through the flow regulator 156 and the cooling system heat exchanger 146, to the air circuit outlet 160. The air circuit inlet 158 of FIG. 4 fluidly couples the cooling system air circuit 142 and its air circuit path 155 to a volume 162 external to and bordering the vane structure 148. Here, the external volume 162 is the bypass flowpath 54; see also FIG. 1. The air circuit inlet 158 of FIG. 4, for example, is formed in an exterior of the vane structure 148 at (e.g., on, adjacent or proximate) the structure leading edge 152. The air circuit outlet 160 of FIG. 4 also fluidly couples the cooling system air circuit 142 and its air circuit path 155 to the external volume 162; e.g., the bypass flowpath. The air circuit outlet 160 of FIG. 4, for example, is formed in the exterior of the vane structure 148 at the structure first side 154A. Here, the air circuit outlet 160 is arranged longitudinally downstream of the air circuit inlet 158 along the vane structure 148. The present disclosure, however, is not limited to such an exemplary air circuit path arrangement. For example, the air circuit inlet 158 may alternatively be disposed to one of the structure sides 154. In another example, the air circuit outlet 160 may be disposed at a trailing edge of the vane structure 148. Moreover, it is contemplated the cooling system air circuit 142 may (or may not) include one or more other components arranged along the air circuit path 155; e.g., air filter(s), additional heat exchanger(s), additional flow regulator(s), sensor device(s), etc.

The flow regulator 156 is arranged fluidly inline along the air circuit path 155 between the air circuit inlet 158 and the air circuit outlet 160. The flow regulator 156 of FIG. 4, for example, is longitudinally spaced downstream of the air circuit inlet 158 along the air circuit path 155. This flow regulator 156 is also longitudinally spaced upstream of the cooling system heat exchanger 146 along the air circuit path 155. Here, the flow regulator 156 of FIG. 4 is disposed within an interior of the vane structure 148. The present disclosure, however, is not limited to such an exemplary arrangement. For example, the flow regulator 156 may alternatively be disposed adjacent or may form the air circuit inlet 158.

The flow regulator 156 is configured to regulate a flow of pressurized air (e.g., forced induction air) directed through the air circuit path 155 from the air circuit inlet 158 to (e.g., into) the cooling system heat exchanger 146. The flow regulator 156, for example, may be configured as or otherwise include a flow diverter, a control valve or a valve system. During a first mode of operation, the flow regulator 156 may open and fluidly couple a section 164 of the air circuit path 155 upstream of the flow regulator 156 to a section 166 of the air circuit path 155 downstream of the flow regulator 156. During a second mode of operation, the flow regulator 156 may close and fluidly decouple the upstream section 164 of the air circuit path 155 from the downstream section 166 of the air circuit path 155 (or facilitate a minimum flow of the pressurized air from the upstream section 164 of the air circuit path 155 to the downstream section 166 of the air circuit path 155). Of course, it is also contemplated the flow regulator 156 may operate in a third mode of operation where the flow regulator 156 partially opens (or partially closes) to facilitate an intermediate metered flow of the pressurized air from the upstream section 164 of the air circuit path 155 to the downstream section 166 of the air circuit path 155.

Referring to FIG. 3, the cooling system fluid circuit 144 includes a fluid circuit path 168, the cooling system heat exchanger 146, one or more electric device heat exchangers 170A and 170B (generally referred to as "170"), a fluid reservoir 172 and a fluid pump 174. This cooling system fluid circuit 144 is thermally coupled to the cooling system air circuit 142 through the cooling system heat exchanger 146. The cooling system fluid circuit 144 is thermally coupled to each EM controller 108 and its electrical circuitry 122 through a respective one of the electric device heat exchangers 170 as described below in further detail.

The fluid circuit path 168 of FIG. 3 extends longitudinally through the cooling system heat exchanger 146, the electric device heat exchangers 170, the fluid reservoir 172 and the fluid pump 174 in a closed loop. The fluid circuit path 168 of FIG. 3, for example, includes one or more heat exchange legs 176A and 176B (generally referred to as "176") and a flow leg 178. Each of the heat exchange legs 176 extends longitudinally from an outlet from the flow leg 178, sequentially through the cooling system heat exchanger 146, a respective one of the electric device heat exchangers 170, back through the cooling system heat exchanger 146, to an inlet into the flow leg 178. With this arrangement, the heat exchange legs 176 are fluidly coupled in parallel with one another between the flow leg inlet and the flow leg outlet. The flow leg 178 extends longitudinally from outlets from the heat exchange legs 176, sequentially through the fluid reservoir 172 and the fluid pump 174, to inlets into the heat exchange legs 176. Here, the fluid circuit path 168 of FIG. 4 is disposed within the interior of the vane structure 148. The present disclosure, however, is not limited to such an exemplary fluid circuit path arrangement. For example, a section of the fluid circuit path 168 may alternatively extend outside of the vane structure 148. In another example, some or all of the fluid circuit members 146, 170, 172 and/or 174 may be configured in another arrangement along the fluid circuit path 168. Moreover, it is contemplated the cooling system fluid circuit 144 may (or may not) include one or more other components arranged along the fluid circuit path 168; e.g., filter(s), additional heat exchanger(s), flow regulator(s), sensor device(s), etc.

Each electric device heat exchanger 170 of FIG. 3 is disposed within the interior of the vane structure 148. Each electric device heat exchanger 170 of FIG. 4, for example, is disposed laterally between a respective one of the structure sides 154 and the cooling system heat exchanger 146. More particularly, each electric device heat exchanger 170 of FIG. 4 is disposed laterally between the electrical circuitry 122A, 122B of a respective one of the EM controllers 108A, 108B and a respective lateral side 180A, 180B (generally referred to as "180") of the cooling system heat exchanger 146. With this arrangement, the cooling system heat exchanger 146 is arranged laterally between the electric device heat exchangers 170A, 170B. The cooling system heat exchanger 146 may also be arranged in conductive thermal communication with each electric device heat exchanger 170. Each electric device heat exchanger 170 of FIG. 3, for example, is disposed next to and may thermally engage the cooling system heat exchanger 146 through the respective controller housing 120.

Each electric device heat exchanger 170 of FIG. 3 is arranged in conductive thermal communication with a respective one of the EM controllers 108 and its respective electrical circuitry 122. Each electric device heat exchanger 170 of FIG. 3, for example, may be configured as a cooling plate to which the electrical circuitry 122 of the respective EM controller 108 may be mounted. More particularly, each electric device heat exchanger 170 may be configured as a mass of thermally conductive material such as metal with one or more internal fluid circuit passages 182A, 182B (generally referred to as "182"; one schematically shown in FIG. 3). These fluid circuit passages 182 collectively form a longitudinal section of the respective heat exchange leg 176 through the respective electric device heat exchanger 170. Each electric device heat exchanger 170 of FIG. 3 is disposed within the interior of the respective controller housing 120, where a sidewall 184A, 184B (generally referred to as "184") of each controller housing 120A, 120B forms a peripheral boundary of the respective EM controller housing interior. Each electric device heat exchanger 170 may be formed integral with, attached to and/or otherwise connected to the respective housing sidewall 184. With this arrangement, each electric device heat exchanger 170 of FIG. 3 is disposed between and engages (e.g., contacts) (a) the respective electrical circuitry 122 and (b) the respective housing sidewall 184. Each EM controller 108 may be mounted to the cooling system heat exchanger 146. Here, both the EM controllers 108 and the electric device heat exchangers 170 are disposed within the interior of the vane structure 148. The present disclosure, however, is not limited to such an exemplary arrangement. For example, each electric device heat exchanger 170 may form the respective housing sidewall 184 such that the respective electric device heat exchanger 170 forms a peripheral boundary of the respective EM controller housing interior. In other example, each electric device heat exchanger 170 may be mounted externally to the respective controller housing 120 and in conductive thermal communication with the electrical circuitry 122 through the respective housing sidewall 184. With such an arrangement, each EM controller 108 may be mounted to the cooling system heat exchanger 146 through the respective electric device heat exchanger 170.

The fluid reservoir 172 is configured to contain a quantity of a working fluid before, during and/or after fluid system operation. The fluid reservoir 172, for example, may be configured as or otherwise include a tank, a cylinder, a pressure vessel, a bladder or any other type of (e.g., liquid) storage container. This fluid reservoir 172 of FIG. 3 is disposed within the interior of the vane structure 148. The working fluid stored within the fluid reservoir 172 (and circulated through the cooling system fluid circuit 144 and its fluid circuit path 168) may be a liquid working fluid such as lubricant, coolant, hydraulic fluid and/or the like.

The fluid pump 174 of FIG. 3 is configured to direct and/or regulate a flow of the working fluid through the fluid circuit path 168 from an outlet from (e.g., a supply of) the fluid reservoir 172, sequentially through the cooling system heat exchanger 146, through the electric device heat exchangers 170 in parallel and back through the cooling system heat exchanger 146, to an inlet into (e.g., a return of) the fluid reservoir 172 for recirculation. This fluid pump 174 of FIG. 3 is disposed within the interior of the vane structure 148.

The cooling system heat exchanger 146 of FIG. 3 is disposed within the interior of the vane structure 148 along the cooling system air circuit 142 and the cooling system fluid circuit 144. The cooling system heat exchanger 146 includes one or more internal air circuit passages 186 (one schematically shown in FIG. 3) and one or more internal fluid circuit passages 188A, 188B (generally referred to as "188"; one schematically shown for each heat exchange leg 176 in FIG. 3). The air circuit passages 186 collectively form a longitudinal section of the air circuit path 155 through the cooling system heat exchanger 146. Each set of the fluid circuit passages 188 collectively form a longitudinal section of a respective one of the heat exchange legs 176A, 176B within the cooling system heat exchanger 146. These fluid circuit passages 188 are fluidly independent from the air circuit passages 186. The air circuit passages 186 and each set of the fluid circuit passages 188 may be arranged to configure the cooling system heat exchanger 146 as a crossflow heat exchanger, a counterflow heat exchanger, a parallel flow heat exchanger, or a hybrid heat exchanger with a combination crossflow, counterflow and/or parallel flow arrangement with respect to the air circuit passages 186 and the respective set of the fluid circuit passages 188. Here, the cooling system heat exchanger 146 is a liquid-to-air heat exchanger between the fluid circuit passages 188 and the air circuit passages 186. The first set of the fluid circuit passages 188A and the second set of the fluid circuit passages 188B may also or alternatively be arranged to configure the cooling system heat exchanger 146 as a crossflow heat exchanger, a counterflow heat exchanger, a parallel flow heat exchanger, or a hybrid heat exchanger with a combination crossflow, counterflow and/or parallel flow arrangement with respect to the sets of the fluid circuit passages 188A and 188B. Here, the cooling system heat exchanger 146 is a liquid-to-liquid heat exchanger between the sets of the fluid circuit passages 188A and 188B.

During operation of the cooling system 36 of FIG. 3, the fluid pump 174 directs (e.g., pumps) relatively cool working fluid out of the fluid reservoir 172, through the fluid circuit path 168 and its flow leg 178 and through the cooling system heat exchanger 146, into each electric device heat exchanger 170. As the working fluid flows within each electric device heat exchanger 170, heat energy generated by operation of the electrical circuitry 122 of the respective EM controller 108 may transfer into the working fluid through the respective electric device heat exchanger 170. This transfer of the heat energy out of the electrical circuitry 122 and into the working fluid cools the electrical circuitry 122 and heats the working fluid. The now heated working fluid is directed out of each electric device heat exchanger 170 and back into the cooling system heat exchanger 146. Simultaneously, the air circuit inlet 158 receives (e.g., bleeds) pressurized air (e.g., bypass bleed air) from the bypass flowpath 54. The flow regulator 156 directs this pressurized air into the cooling system heat exchanger 146. As the working fluid and the pressurized air flow within the cooling system heat exchanger 146, at least some (or all) of the heat energy that was previously received from the electrical circuitry 122 may transfer out of the working fluid and into the pressurized air through the cooling system heat exchanger 146. This transfer of the heat energy out of the working fluid and into the pressurized air cools the working fluid and heats the pressurized air. The now cooled working fluid is directed out of the cooling system heat exchanger 146, through the fluid circuit path 168 and its flow leg 178, and back into the fluid reservoir 172 for subsequent recirculation. Simultaneously, the now heated pressurized air may be exhausted out of the cooling system air circuit 142 through the air circuit outlet 160. By exhausting this air back into the bypass flowpath 54, the exhausted air may facilitate some thrust recuperation.

The vane structure 148 of FIGS. 3 and 4 is described above as the bifurcation structure 150 in the bypass flowpath 54 of FIG. 1. The present disclosure, however, is not limited to such an exemplary arrangement. The vane structure 148 of FIGS. 3 and 4, for example, may alternatively be configured as or otherwise include a pylon structure 190 as shown, for example, in FIG. 1. This pylon structure 190 is configured to mount the aircraft propulsion system 22 to a component (e.g., an aircraft wing, an aircraft fuselage, etc.) of an airframe of the aircraft. With such an arrangement, the external volume 162 of FIGS. 3 and 4 may be the external environment 92 of FIG. 1.

Figure 5:
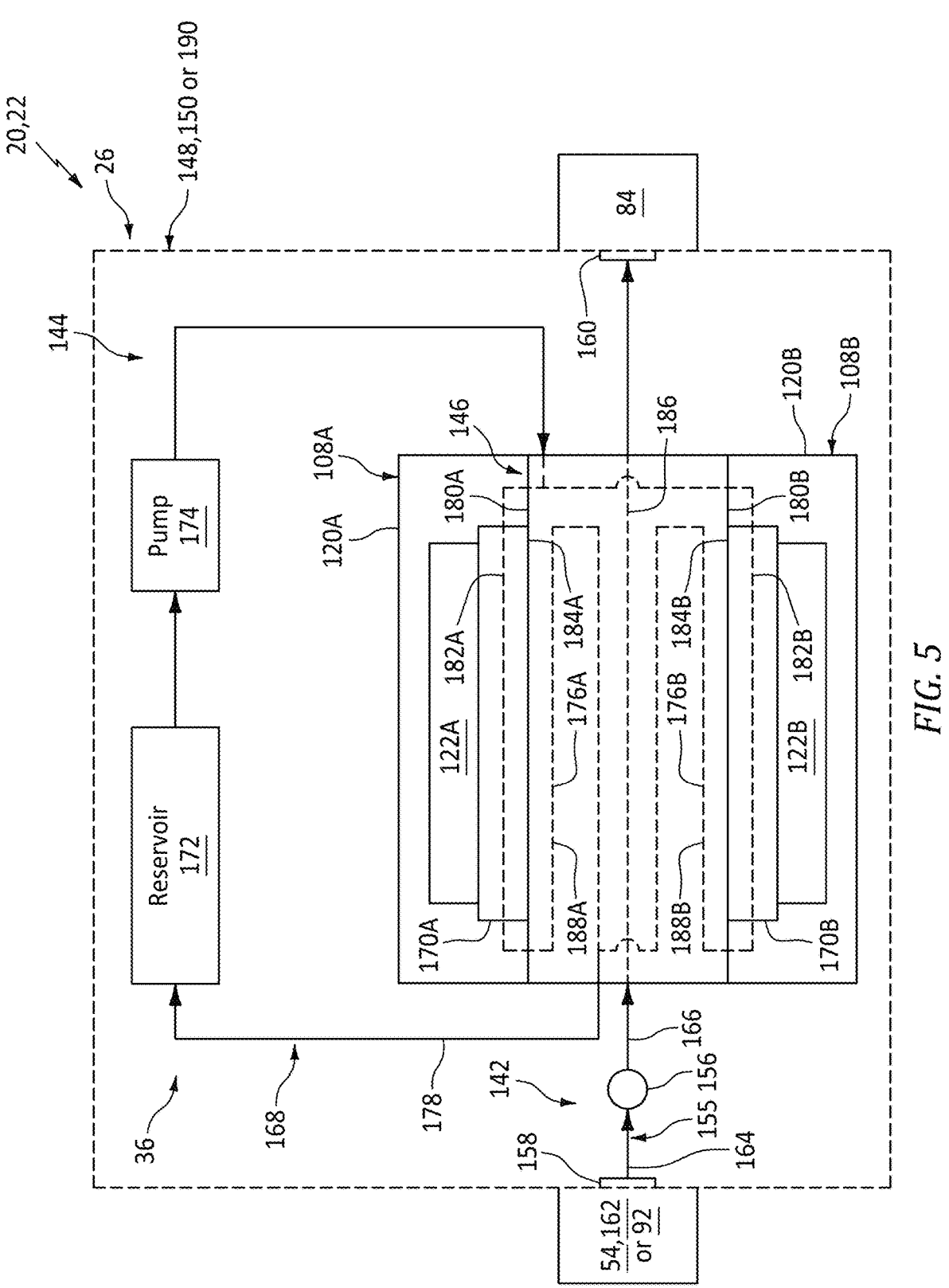
FIGS. 5 and 6 are schematic illustrations of a portion of the aircraft propulsion system at the cooling system with various alternative air sink arrangements.
Figure 6:
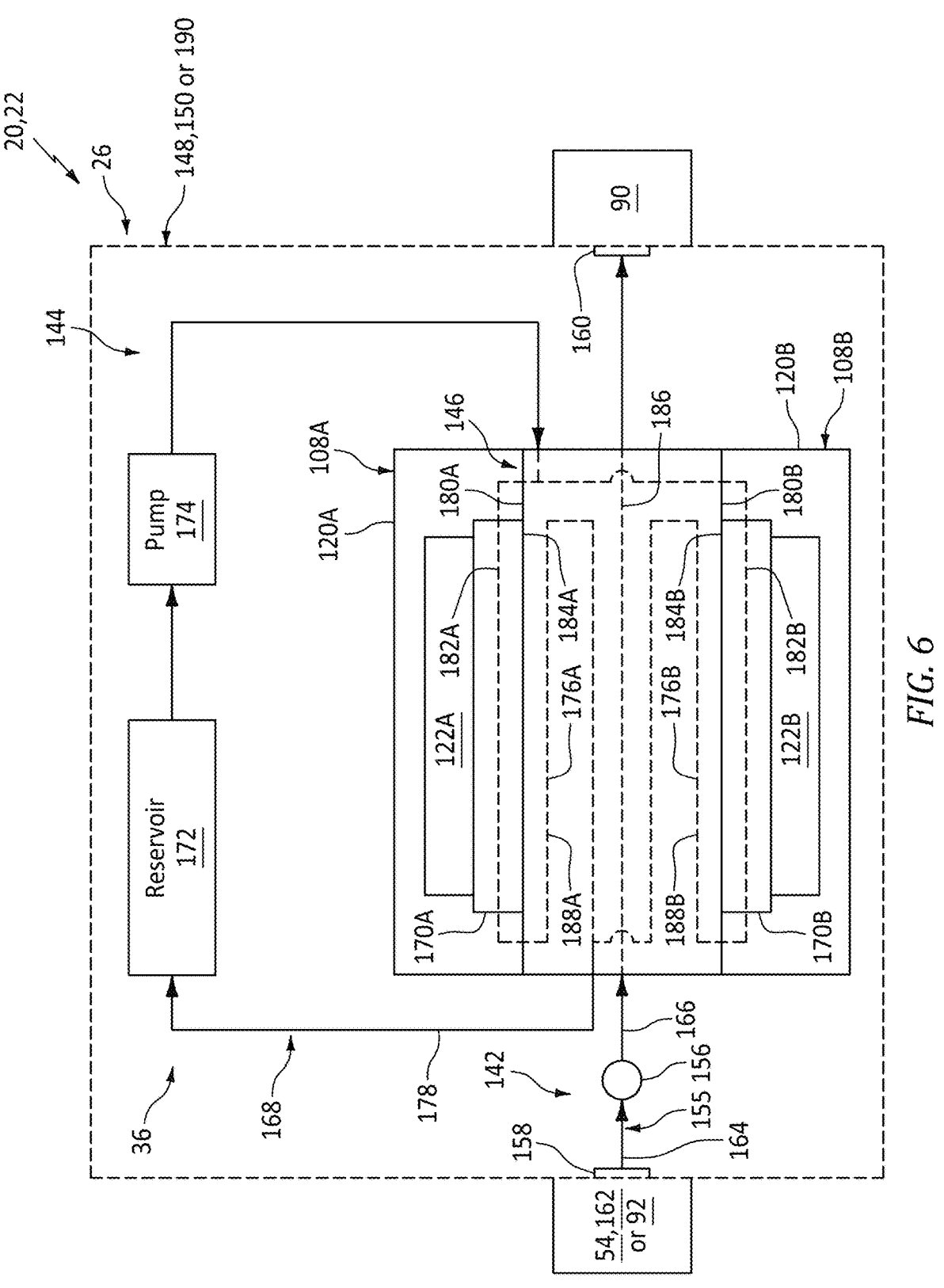

In some embodiments, referring to FIGS. 3 and 4, the air circuit inlet 158 and the air circuit outlet 160 may fluidly couple the cooling system air circuit 142 and its air circuit path 155 to the common external volume 162; e.g., the bypass flowpath 54, the external environment 92, etc. The present disclosure, however, is not limited to such an exemplary arrangement. For example, it is contemplated the cooling system air circuit 142 may alternatively exhaust its air into another internal volume within the aircraft propulsion system 22 for venting, cooling, etc. For example, referring to FIG. 5, the cooling system air circuit 142 may exhaust its air into the inner housing compartment 84. In another example, referring to FIG. 6, the cooling system air circuit 142 may exhaust its air into the outer housing compartment 90, or otherwise.

In some embodiments, referring to FIG. 2, the electric machines 106 may be arranged with the inner housing structure 28 within the inner housing compartment 84. In such embodiments, the electric cables 124 may run radially through the interior of the vane structure 148 of FIG. 1 into the inner housing compartment 84.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:
a vane structure;
a first electric device disposed within the vane structure, the first electric device including a first device housing and first electrical circuitry housed within an interior of the first device housing; and
a cooling system configured to cool the first electrical circuitry, the cooling system including a first heat exchanger and an air circuit, the first heat exchanger disposed within the vane structure and thermally coupled to the first electric device, the air circuit extending within the vane structure from an airflow inlet into the air circuit, through the first heat exchanger, to an airflow outlet from the air circuit, and the airflow inlet fluidly coupling the air circuit to a volume external to the vane structure.

2. The assembly of claim 1, wherein the first electric device is next to the first heat exchanger.

3. The assembly of claim 1, wherein the first electric device is mounted to the first heat exchanger.

4. The assembly of claim 1, wherein the first electrical circuitry is thermally coupled to the first heat exchanger by conduction through at least a sidewall of the first electric device between the first electrical circuitry and the first heat exchanger.

5. The assembly of claim 1, wherein
the cooling system further comprises a fluid circuit thermally coupling the first heat exchanger to the first electric device; and
the fluid circuit extends through the first heat exchanger.

6. The assembly of claim 5, wherein the fluid circuit extends through the first electric device.

7. The assembly of claim 5, wherein
the fluid circuit comprises a second heat exchanger thermally coupled to the first electrical circuitry; and
the fluid circuit extends through the second heat exchanger.

8. The assembly of claim 5, further comprising:
a second electric device disposed within the vane structure, the second electric device including a second device housing and second electrical circuitry, and the second electrical circuitry housed within an interior of the second device housing;
the cooling system configured to cool the second electrical circuitry, and the fluid circuit thermally coupling the first heat exchanger to the second electric device.

9. The assembly of claim 5, wherein
the fluid circuit is a closed loop fluid circuit; and
the fluid circuit comprises a circuit path, a pump and a reservoir fluidly coupled inline along the circuit path with the first heat exchanger.

10. The assembly of claim 1, wherein the air circuit comprises a flow regulator configured to regulate a flow of air directed from the airflow inlet to the first heat exchanger.

11. The assembly of claim 1, further comprising:
a second electric device disposed within the vane structure, the second electric device including a second device housing and second electrical circuitry, and the second electrical circuitry housed within an interior of the second device housing;
the cooling system configured to cool the second electrical circuitry, and the first heat exchanger thermally coupled to the second electric device within the vane structure.

12. The assembly of claim 11, wherein the first heat exchanger is disposed between the first electric device and the second electric device.

13. The assembly of claim 1, further comprising:
a compressor section;
a combustor section;
a turbine section; and
a flowpath bypassing at least one of the compressor section, the combustor section or the turbine section, the flowpath comprising the volume external to the vane structure.

14. The assembly of claim 1, wherein the volume external to the vane structure is an environment external to the aircraft powerplant.

15. The assembly of claim 1, further comprising:

a first electric machine configurable as at least one of a first electric motor or a first electric generator; and a first controller configured to control operation of the first electric machine, the first controller comprising the first electric device.

16. The assembly of claim 15, further comprising a rotating structure operatively coupled to the first electric machine, the rotating structure comprising a bladed rotor.

17. An assembly for an aircraft powerplant, comprising:

a first electric device including a first device housing and first electrical circuitry housed within an interior of the first device housing;

a second electric device including a second device housing and second electrical circuitry, the second electrical circuitry housed within an interior of the second device housing;

a cooling system configured to cool the first electrical circuitry and the second electrical circuitry, the cooling system comprising a first heat exchanger disposed laterally between and thermally coupled to the first electric device and the second electric device; and a vane structure, wherein at least the first electric device and the first heat exchanger are disposed within the vane structure.

18. The assembly of claim 17, wherein the cooling system further comprises an air circuit extending through the first heat exchanger.

19. The assembly of claim 17, wherein the cooling system further comprises a closed loop fluid circuit extending in parallel through the first electric device and the second electric device, and through the first heat exchanger.

20. An assembly for an aircraft powerplant, comprising:

a first electric device including a first device housing and first electrical circuitry housed within an interior of the first device housing;

a cooling system configured to cool the first electrical circuitry, the cooling system including a first heat exchanger, an air circuit and a closed loop fluid circuit, the first heat exchanger configured to transfer heat energy between air flowing in the air circuit and a working fluid flowing in the closed loop fluid circuit, the first electric device mounted to a side of the first heat exchanger, the air circuit extending through the first heat exchanger, the closed loop fluid circuit extending through the first heat exchanger and the first electric device, the closed loop fluid circuit thermally coupled to the first electrical circuitry, and the closed loop fluid circuit comprising a pump configured to circulate the working fluid; and a vane structure, wherein at least the first electric device and the first heat exchanger are disposed within the vane structure.

\* \* \* \* \*